United States Patent
Tejaprakash et al.

(10) Patent No.: US 10,581,717 B2
(45) Date of Patent: Mar. 3, 2020

(54) AUTOMATED VIRTUAL NETWORK FUNCTION TEST CONTROLLER

(71) Applicant: Verizon Patent and Licensing Inc., Arlington, VA (US)

(72) Inventors: Nitheesh S. Tejaprakash, Tampa, FL (US); Andrew T. Caso, Lutz, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 169 days.

(21) Appl. No.: 15/719,892

(22) Filed: Sep. 29, 2017

(65) Prior Publication Data

US 2019/0104047 A1   Apr. 4, 2019

(51) Int. Cl.
G06F 15/16 (2006.01)
H04L 12/26 (2006.01)
H04L 12/24 (2006.01)

(52) U.S. Cl.
CPC .............. *H04L 43/50* (2013.01); *H04L 41/22* (2013.01); *H04L 43/04* (2013.01); *H04L 43/06* (2013.01)

(58) Field of Classification Search
CPC ......... H04L 43/50; H04L 43/04; H04L 43/06; H04L 43/14; H04L 41/22; H04L 41/20; H04L 63/1408
USPC ................................................. 709/223, 224
See application file for complete search history.

(56) References Cited

U.S. PATENT DOCUMENTS

| | | | |
|---|---|---|---|
| 9,430,262 B1 * | 8/2016 | Felstaine | G06F 9/45558 |
| 9,785,412 B1 * | 10/2017 | Huynh Van | G06F 8/24 |
| 9,843,624 B1 * | 12/2017 | Taaghol | H04L 67/10 |
| 10,218,590 B2 * | 2/2019 | Gupta | H04L 43/06 |
| 2014/0229945 A1 * | 8/2014 | Barkai | H04L 49/70 718/1 |
| 2015/0234725 A1 * | 8/2015 | Cillis | G06F 11/263 714/33 |
| 2016/0149788 A1 * | 5/2016 | Zhang | H04L 43/10 709/224 |
| 2016/0224460 A1 * | 8/2016 | Bryant | G06F 8/61 |
| 2016/0352865 A1 * | 12/2016 | Gupta | H04L 67/42 |
| 2018/0063848 A1 * | 3/2018 | Ashrafi | H04L 41/0823 |
| 2018/0176115 A1 * | 6/2018 | Yang | H04L 41/0631 |
| 2018/0199218 A1 * | 7/2018 | Ashrafi | H04W 24/04 |
| 2018/0309632 A1 * | 10/2018 | Kompella | H04L 41/145 |
| 2018/0343567 A1 * | 11/2018 | Ashrafi | H04B 7/024 |
| 2019/0044869 A1 * | 2/2019 | Wang | G06F 11/3466 |
| 2019/0052549 A1 * | 2/2019 | Duggal | H04L 41/5045 |
| 2019/0104047 A1 * | 4/2019 | Tejaprakash | H04L 43/50 |
| 2019/0174466 A1 * | 6/2019 | Zhang | H04L 5/0048 |
| 2019/0280914 A1 * | 9/2019 | Menon | H04L 41/0654 |
| 2019/0296997 A1 * | 9/2019 | Menon | H04L 43/0829 |

* cited by examiner

*Primary Examiner* — Thu Ha T Nguyen

(57) ABSTRACT

A device can receive a test package for testing. The test package can include at least one virtual network function (VNF) for testing. The device can configure the testing for the test package based on the VNF included in the test package or a vendor associated with the VNF. The device can execute the testing for the test package based on configuring the testing for the test package. The testing can include onboarding testing and post-onboarding testing. The device can generate a report based on a result of the executing the testing for the test package. The device can provide output identifying the report.

20 Claims, 6 Drawing Sheets

AUTOMATED VIRTUAL NETWORK FUNCTION TEST CONTROLLER

BACKGROUND

Network function virtualization (NFV) is a network architecture concept that virtualizes entire classes of network node functions into building blocks that can connect, or chain together, to create communication services. The NFV architecture includes virtual network functions (VNFs) which are software implementations of network functions. A VNF can consist of one or more virtual machines running different software and processes, on top of high-volume servers, switches, and/or storage devices, instead of having custom hardware appliances for each network function.

Software-defined networking (SDN) technology is an approach to computer networking that allows network administrators to programmatically initialize, control, change, and manage network behavior dynamically via open interfaces and abstraction of lower-level functionality. SDN is meant to address the fact that the static architecture of traditional networks does not support the dynamic, scalable computing and storage needs of more modern computing environments, such as data centers. SDN can be used to decouple or disassociate the system that makes decisions about where traffic is sent from the underlying systems that forward traffic to the selected destination.

DETAILED DESCRIPTION OF PREFERRED EMBODIMENTS

The following detailed description of example implementations refers to the accompanying drawings. The same reference numbers in different drawings can identify the same or similar elements.

A network operator can utilize software defined networking (SDN) and network function virtualization (NFV) to manage packet routing for a network provided by the network operator, interaction with backend networks provided by one or more backend network providers, and/or the like. For example, the network operator can deploy a virtual network function (VNF) to perform a firewalling functionality, a routing functionality, a wide area networking (WAN) functionality, and/or the like. The network operator can receive access to a VNF from a vendor for deployment in the network. The network operator can test the VNF before implementing the VNF to avoid reduced network performance from an error-filled VNF. However, testing and certification of new software can be a resource intensive, time-consuming procedure that is susceptible to human error.

Some implementations, described herein, can provide a test control device to automatically test, certify, and deploy VNFs for use in a network. The test control device can integrate tools collocated in a cloud computing environment with the test control device, external tools (e.g., vendor provided tools), and/or the like into an end-to-end testing platform. Moreover, the test control device can automatically configure testing for the VNF. In this way, the test control device can reduce an amount of time to test and certify a VNF, thereby improving network performance relative to a manual technique that results in VNF deployment being delayed. Moreover, based on implementing the test control device in a cloud computing environment, the test control device can automatically scale and reallocate computing resources for testing, sandboxing, and/or the like, thereby reducing resource utilization (e.g., computing resource utilization, memory resource utilization, and/or the like) relative to a manual testing technique. Furthermore, based on automating test generation, execution, and validation, the test control device can reduce errors relative to manual testing, and can enable thousands and/or millions of tests to be performed, which can be infeasible for a human, thereby improving a quality of VNFs that are deployed.

Figure 1:
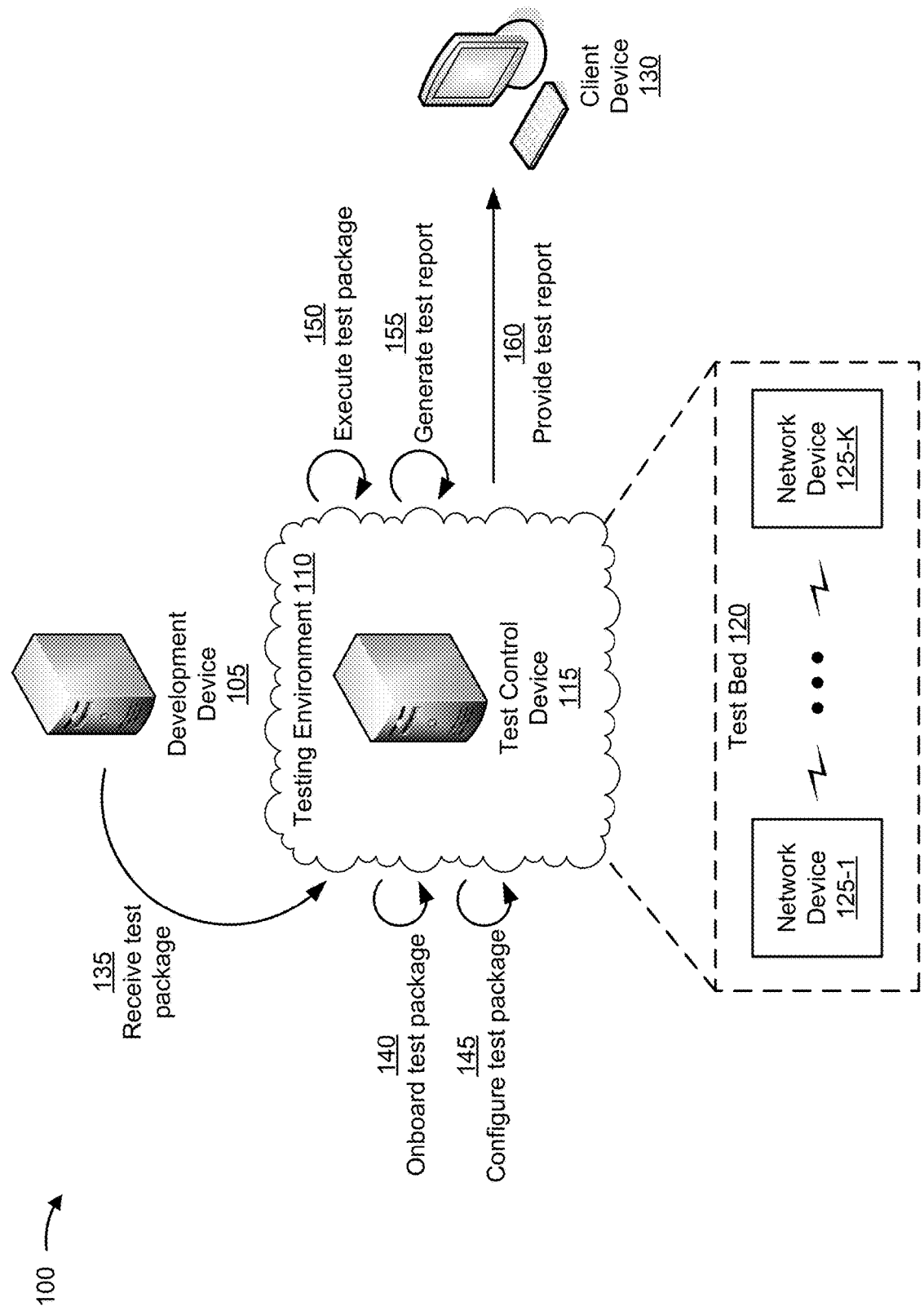
FIG. 1 is a diagram of an overview of an example implementation described herein.

FIG. 1 is a diagram of an overview of an example implementation 100 described herein. As shown in FIG. 1, example implementation 100 can include development device 105, testing environment 110 including test control device 115, test bed 120 including network devices 125-1 to 125-K (e.g., virtualized implementations of network devices provided by testing environment 110 in test bed 120), and client device 130.

As further shown in FIG. 1, and by reference number 135, test control device 115 can initially receive a test package (e.g., including VNF or other SDN functionality, tests, test scripts, use cases, selection of tests, configuration for tests, etc.). As shown by reference number 140, test control device 115 can onboard the test package (e.g., by providing a VNF onboarding portal for VNF developers and receiving a test package submission via the onboarding portal). As shown by reference number 145, test control device 115 can configure the test package (e.g., import the test package into test bed 120, identify test cases, obtain and use external tools for testing, etc.).

As further shown in FIG. 1, and by reference number 150, test control device 115 can execute the test package. For example, test control device 115 can execute the test package using test bed 120 (e.g., a sandbox of network devices 125-1 to 125-K, which can be instantiated and arranged into one or more network topologies to perform testing). In some implementations, test control device 115 can perform multiple types of tests, such as a resource utilization test, a networking test, a performance test, and/or the like. For example, test control device 115 can cause packets to be routed from a source network device 125 to a destination network device 125 to test routing, firewalling, WAN optimization (e.g., route selection optimization, load balancing optimization, etc.), and/or the like.

As further shown in FIG. 1, and as shown by reference number 155, test control device 115 can generate a test report. For example, the test report can include results of the test, whether the test passed or failed, whether a VNF is to be deployed or rejected, portions of program code of a VNF for error correction, outputs from one or more external tools, and/or the like. As shown by reference number 160, test control device 115 can provide the test report, such as to client device 130.

In this way, the test control device can reduce an amount of time to test and certify a VNF, thereby improving network performance relative to a manual technique that results in VNF deployment being delayed. Moreover, based on implementing the test control device in a cloud computing environment, the test control device can automatically scale and reallocate computing resources for testing, sandboxing, and/or the like, thereby reducing resource utilization (e.g., computing resource utilization, memory resource utilization, and/or the like) relative to a manual testing technique. Furthermore, based on automating test generation, execution, and validation, the test control device can reduce errors relative to manual testing, and can enable thousands and/or millions of tests to be performed, which can be infeasible for a human, thereby improving a quality of VNFs that are deployed.

As indicated above, FIG. 1 is provided merely as an example. Other examples are possible and can differ from what was described with regard to FIG. 1. For example, there can be additional devices and/or networks, fewer devices and/or networks, different devices and/or networks, or differently arranged devices and/or networks than those shown in FIG. 1. Furthermore, two or more devices shown in FIG. 1 can be implemented within a single device, or a single device shown in FIG. 1 can be implemented as multiple, distributed devices. Additionally, or alternatively, a set of devices (e.g., one or more devices) of example implementation 100 can perform one or more functions described as being performed by another set of devices of example implementation 100.

Figure 2:
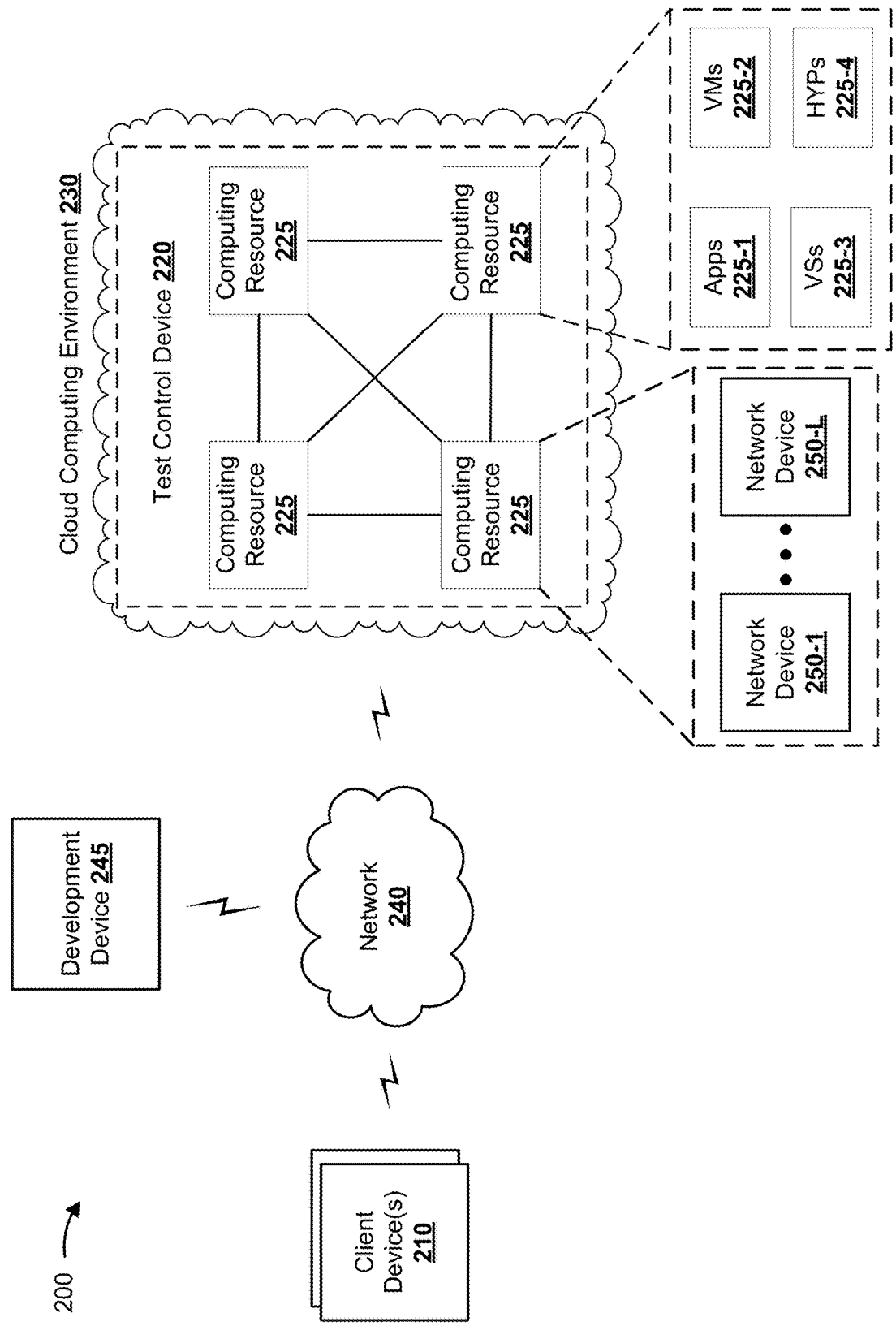
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a test control device 220 hosted within a cloud computing environment 230, a network 240, a development device 245, and one or more network devices 250. Devices of environment 200 can interconnect via wired connections, wireless connections, optical connections, or a combination of connections.

Client device 210 includes one or more devices capable of receiving, generating, storing, processing, and/or providing information associated with deployment of a VNF. For example, client device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device that can receive a test report and provide the test report for display to a user. In some implementations, client device 210 corresponds to client device 130 shown in FIG. 1.

Cloud computing environment 230 includes an environment that delivers computing as a service, whereby shared resources, services, etc. can be provided to test a VNF to enable automatic testing and/or deployment of VNFs. Cloud computing environment 230 can provide computation, software, data access, storage, and/or other services that do not require end-user knowledge of a physical location and configuration of a system and/or a device that delivers the services. As shown, cloud computing environment 230 can include a test control device 220 and one or more computing resources 225. In some implementations, cloud computing environment can correspond to and/or implement at least one of testing environment 110, test control device 115, test bed 120, network device 125, and/or the like.

Computing resource 225 includes one or more personal computers, workstation computers, server devices, or another type of computation and/or communication device. In some implementations, computing resource 225 can host test control device 220. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, optical connections, or a combination of connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by client device 210. Application 225-1 can eliminate a need to install and execute the software applications on client device 210. For example, application 225-1 can include software associated with test control device 220 and/or any other software capable of being provided via cloud computing environment 230. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., client device 210), and can manage infrastructure of cloud computing environment 230, such as data management, synchronization, or long-duration data transfers. In some implementations, a set of virtual machines 225-2 can be deployed as a set of network devices with a configured topology to test a VNF.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Development device 245 includes one or more devices capable of receiving, generating, storing, processing, and/or providing information associated with deployment of a VNF. For example, development device 245 can include a communication and/or computing device, such as a mobile phone (e.g., a smart phone, a radiotelephone, etc.), a computer (e.g., a laptop computer, a tablet computer, a handheld computer, etc.), a server, and/or the like to provide a VNF for testing via cloud computing environment 230. In some implementations, development device 245 corresponds to development device 105 shown in FIG. 1.

Network device 250 includes physical and/or virtualized instances of one or more devices (e.g., one or more traffic transfer devices) capable of processing and/or transferring traffic between endpoint devices. For example, network device 250 can include a firewall, a router, a gateway, a switch, a hub, a bridge, a reverse proxy, a server (e.g., a proxy server), a security device, an intrusion detection device, a load balancer, or a similar device. In some implementations, network device 250 can include a physical device, such as a router connected to and/or controlled by computing resource 225. In some implementations, network device 250 can include a virtualized device implemented by computing resource 225 in a test bed to provide a testing environment for a VNF. In some implementations, network device 250 corresponds to network device 125 shown in FIG. 1.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
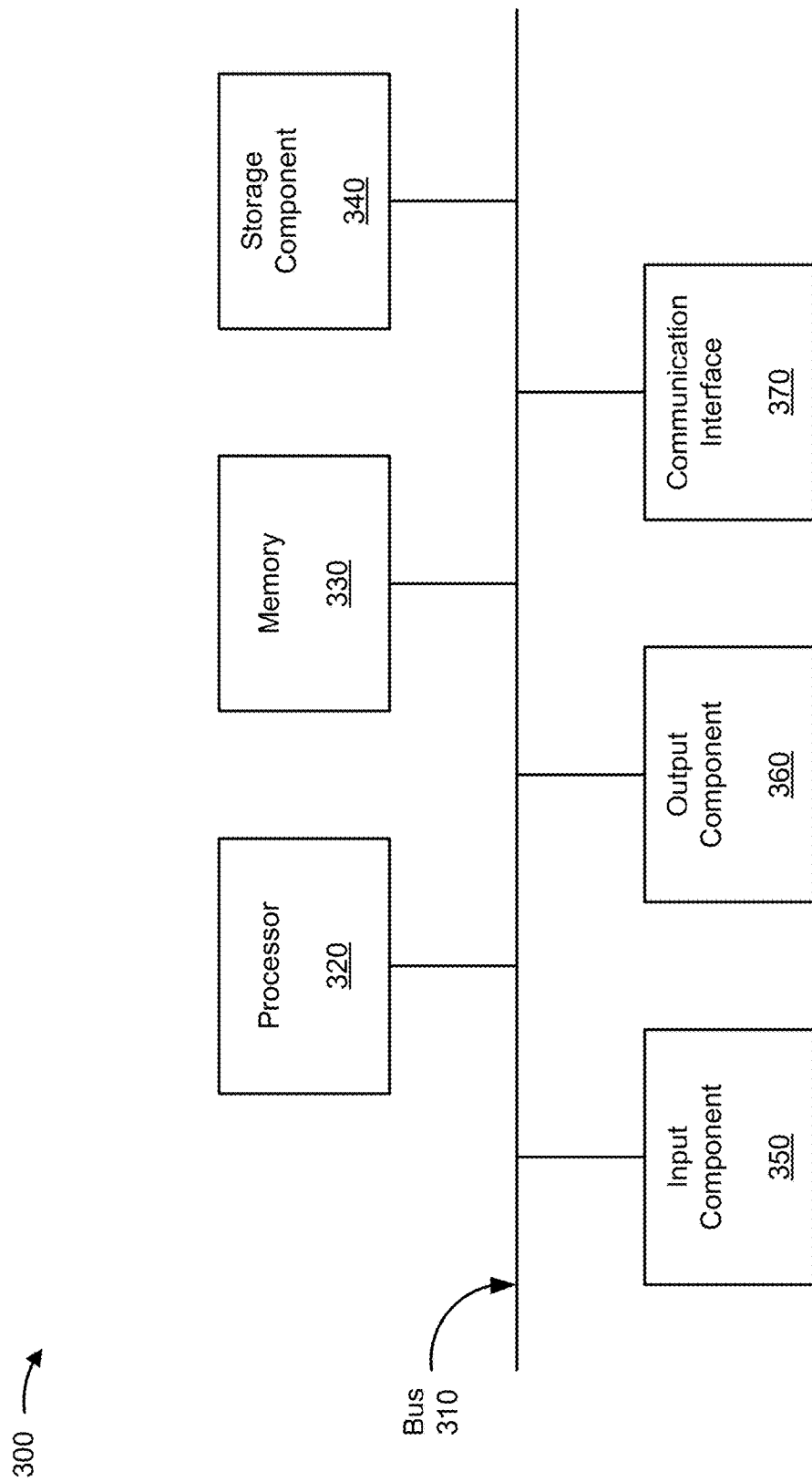
FIG. 3 is a diagram of example components of one or more devices of FIG. 2.

FIG. 3 is a diagram of example components of a device 300. Device 300 can correspond to client device 210, test control device 220, cloud computing environment 230, development device 245, and/or network device 250. In some implementations, client device 210, test control device 220, cloud computing environment 230, development device 245, and/or network device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
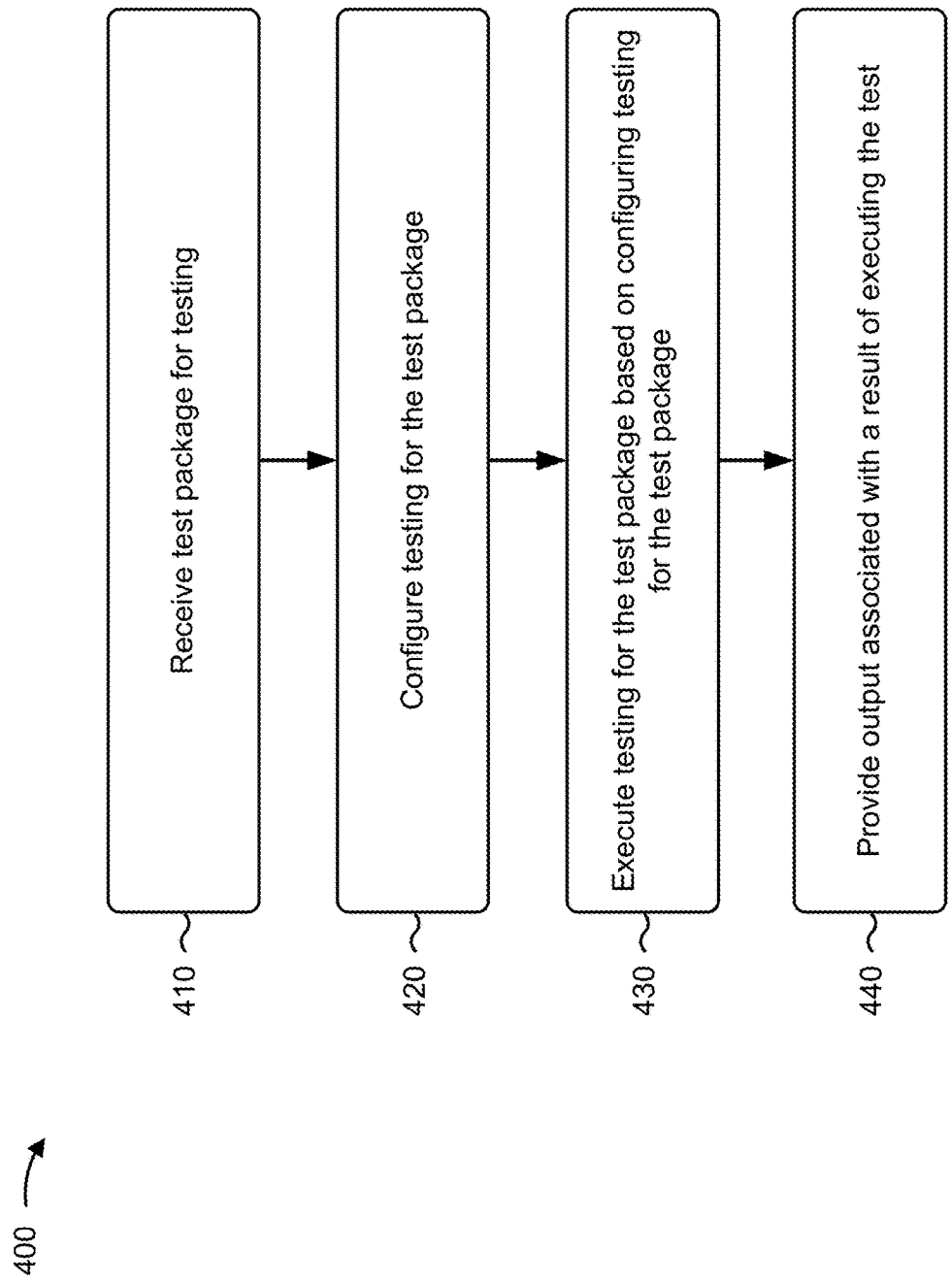
FIG. 4 is a flow chart of an example process for automated testing control.

FIG. 4 is a flow chart of an example process 400 for automated testing control. In some implementations, one or more process blocks of FIG. 4 can be performed by test control device 220. In some implementations, one or more process blocks of FIG. 4 can be performed by another device or a group of devices separate from or including test control device 220, such as client device 210, cloud computing environment 230, development device 245, and/or network device 250.

As shown in FIG. 4, process 400 can include receiving a test package for testing (block 410). For example, test control device 220 can receive a test package for testing.

In some implementations, the test package can include VNF or other SDN functionality for deployment to perform SDN in a network. In some implementations, the test package can include tests, test scripts, use cases (e.g., to auto generate tests), and/or the like. In some implementations, the test package can include selection of tests, configuration for tests, and/or the like.

In some implementations, test control device 220 can receive the test package from a portal. For example, test control device 220 can provide a VNF onboarding portal for use by external VNF developers, and can receive a test package submission including a VNF for testing. In some implementations, test control device 220 can receive a test package upload from a data structure.

In some implementations, test control device 220 can perform package validation procedures. For example, test control device 220 can determine that a test package includes a VNF, configuration information for testing, requirements for generating test cases, or the like. In some implementations, test control device 220 can perform security validation procedures. For example, test control device 220 can authenticate the test package for testing (e.g., based on a user privilege, a user role, a package source, etc.). In this case, a first user can be granted a first privilege and a second user can be granted a second privilege. Further to the example, the first privilege can grant access to first testing procedures, first network topologies, first computing resources, and/or the like and the second privilege can grant access to second, different testing procedures, second, different network topologies, second, different computing resources, and/or the like.

In this way, test control device 220 receives the test package for testing.

As further shown in FIG. 4, process 400 can include configuring testing for the test package (block 420). For example, test control device 220 can configure testing for the test package.

In some implementations, test control device 220 can perform VNF instantiation. For example, test control device 220 can import the test package into a test bed (e.g., sandbox) environment (e.g., an instance of network devices 250). In some implementations, test control device 220 can allocate resources for network devices 250.

In some implementations, test control device 220 can determine a set of tests to perform, as described herein. In this case, test control device 220 can determine a set of test cases for the set of tests. For example, test control device 220 can receive user selected test cases, and can automatically identify test cases based on a test package, stored information identifying previous test cases for previous test packages, and/or the like. In this case, test control device 220 can determine a similarity between a test package and previous test packages to select previous test cases, such as based on a VNF type, an SDN type, a test package source (e.g., a user, a vendor, a company, an industry, a geography, etc.), and/or the like.

In some implementations, test control device 220 can configure testing based on a role of a user. For example, some users can have access to some testing functions, and other users can have access to other testing functions. As specific examples, a vendor type of user can have access to a first set of testing capabilities using a sandbox environment of network devices 250, an Information technology (IT) type of user can have access to a second set of testing capabilities, a manager can have access to a third set of testing capabilities, and/or the like.

In some implementations, test control device 220 can obtain access to an external tool to configure testing for the test package. For example, test control device 220 can communicate with an external tool (e.g., using an application programming interface (API) to obtain code, provide code, test code, instantiate sandbox environments, perform testing, and/or the like).

In some implementations, test control device 220 can utilize external tools to perform tests. In some implementations, test control device 220 can communicate with a server external to cloud computing environment 230 that operates a particular testing tool to provide the test package for testing using the server and to receive results of testing using the server. In various implementations, the external tools can include OpenNFV testing functionalities, Ixia testing functionalities, Scapy packet manipulation testing and monitoring, enterprise content management (ECM) based tools, external network traffic emulators, load generators, custom scripts, and/or the like.

In some implementations, test control device 220 can utilize an external orchestrator to perform tests. For example, test control device 220 can utilize Rift.io based orchestration, Ericsson Dynamic Orchestration services based orchestration, Hewlett Packard Enterprise (HPE) Operations Orchestration based orchestration, and/or the like.

In some implementations, test control device 220 can utilize an external repository management tool to manage binary components of the test package. For example, test control device 220 can utilize a Hewlett Packard (HP) Application Lifecycle Management Tool (ALM), JIRA, Git, and/or the like. In some implementations, test control device 220 can obtain a set of test modeling test cases from the external repository management tool. In this case, test control device 220 can store tests, test cases, statuses of tests, requirements, requirements mapping, etc. using the external repository management tool. In some implementations, test control device 220 can automatically map tests to requirements of a requirements document to determine test coverage. For example, test control device 220 can add tests to satisfy test coverage criteria, remove duplicative tests to reduce resource utilization, and/or the like.

In some implementations, test control device 220 can utilize a continuous integration and continuous deployment (CICD) tool set for testing during development of the VNF. For example, test control device 220 can automatically trigger testing on a VNF of the test package during development of the VNF (e.g., based on one or more testing criteria being satisfied) and can automatically deploy versions of a VNF of the test package based on results of the automatically triggered testing. In some implementations, test control device 220 can utilize a version control tool to perform testing on versions of a VNF. For example, test control device 220 can trigger a version control tool to provide a version of the VNF as a test package, and can provide results of testing to the version control tool to enable error correction for subsequent versions. In some implementations, test control device 220 can utilize a tool of test control device 220 (e.g., a collocated tool), a vendor provided tool (e.g., a tool provided by a vendor of the VNF and not collocated with test control device 220 in cloud computing environment 230), an open source tool, and/or the like.

In some implementations, test control device 220 can automatically generate a set of test cases based on a test model or using an output of a test case management tool. For example, test control device 220 can automatically generate a test model based on a set of use cases. In this case, test control device 220 can utilize a Zephyr test management tool, a JBehave test driven development tool, a JMeter load testing tool, and/or the like. In some implementations, test control device 220 can obtain a set of test scripts from a test script repository. In some implementations, test control device 220 can utilize a behavioral driven test case generation tool to generate the set of test cases.

In some implementations, test control device 220 can configure an automation server to automate a set of test cases. For example, test control device 220 can configure a Jenkins based automation server. In some implementations, test control device 220 can generate a testing workflow to organize a set of tests into an ordering for the set of tests (e.g., based on resource utilization, criticality, time, etc.). In some implementations, test control device 220 can obtain an external performance measurement tool (e.g., from a tool repository, from a vendor that provided the test package, etc.).

In this way, test control device configures testing for the test package.

As further shown in FIG. 4, process 400 can include executing testing for the test package based on configuring testing for the test package (block 430). For example, test control device 220 can execute testing for the test package based on configuring testing for the test package.

In some implementations, test control device 220 can execute testing in an order based on a configured workflow, in a user selected order, and/or the like. In some implementations, test control device 220 can execute multiple tests sequentially, concurrently, and/or the like.

In some implementations, test control device 220 can monitor execution of the tests and store a status and/or results of the tests. In some implementations, test control device 220 can periodically provide update notifications on the status of tests (e.g., a threshold quantity of tests completed, a threshold quantity of tests failed, etc.).

In some implementations, test control device 220 can perform initial testing (e.g., first testing) to onboard a test package. For example, test control device 220 can initially perform a smoke test (e.g., a confidence test, a build verification test (BVT), a build acceptance test, etc.). In this case, test control device 220 can execute a selected subset of test cases relating to components or aspects of the test package determined to be associated with a threshold criticality to the test package.

As another example, test control device 220 can initially perform an image load test. For example, test control device 220 can import a portion of the test package into a sandbox environment for testing (e.g., an instance of network devices 250). As yet another example, test control device 220 can initially perform an image access test. For example, test control device 220 can test to determine whether an ECM software package can access a portion of the test package. As still another example, test control device 220 can initially perform a resource utilization test. For example, test control device 220 can test to determine resource utilization of aspects of a test package to determine whether enough computing resources are allocated to testing the test package (and can dynamically reallocate resources based on results). As another example, test control device 220 can initially perform a configuration test. For example, test control device 220 can utilize a set of test case configurations for aspects of the test package to determine whether aspects of the test package execute under the test of test case configurations.

In some implementations, test control device 220 can perform subsequent testing (e.g., second testing) after onboarding the test package. For example, test control device 220 can perform a security test during post-onboarding testing. In this case, test control device 220 can import a test package into a sandbox environment (e.g., an instance of network devices 250) and utilize a security verification tool to determine whether a set of security criteria are satisfied, such as resilience to unauthorized access, authentication procedures, and/or the like.

As another example, test control device 220 can perform a networking test during post-onboarding testing. For example, test control device 220 can import a test package and cause a set of packets to be routed in the sandbox environment to determine whether networking (e.g., software defined wide area networking (SD WAN)) does not result in errors, whether an SD WAN is optimized based on multiple different topology configurations for the sandbox, and/or the like.

As other examples, test control device 220 can perform one or more performance tests (e.g., to determine delay, jitter, scalability, etc. using different sandbox configurations). As yet other examples, test control device 220 can perform one or more exploratory tests (e.g., test control device 220 can determine behavioral characteristics of a test package using different sandbox configurations, can use data driven testing (DDT) to test a set of conditions against a set of expected outputs, etc.). As still other examples, test control device 220 can perform one or more service chain tests (e.g., to test an end to end service chain of software-defined networking (SDN) capabilities). In this case, test control device 220 can execute testing for a test package in connection with other VNFs and SDNs that are to be used for networking to ensure interoperability of current VNFs and SDNs and one or more VNFs or SDNs of the test package.

In this way, test control device 220 executes testing for the test package based on configuring testing for the test package.

As further shown in FIG. 4, process 400 can include providing output associated with a result of executing the test (block 440). For example, test control device 220 can provide output associated with a result of executing the test.

In some implementations, test control device 220 can provide a test report. For example, test control device 220 can generate a user interface and provide the user interface via client device 210, provide notification (via email, phone message, text message, etc.), and/or the like. In some implementations, the test report can include results of the test, whether the test is passed or failed, whether the VNF is to be deployed or rejected, areas of the VNF for error correction, outputs from one or more external tools, and/or the like.

In some implementations, test control device 220 can certify a test package as satisfying one or more testing criteria (e.g., passing each test, passing a threshold quantity of tests, satisfying one or more performance criteria, etc.). In some implementations, test control device 220 can accept a test package. For example, if the test package satisfies one or more testing criteria, test control device 220 can automatically deploy the VNF into a network to perform SDN functionality.

In some implementations, test control device 220 can upload a VNF of the test package to a repository for use (e.g., an external repository as described herein, a data structure of cloud computing environment 230, etc.). In some implementations, test control device 220 can store multiple VNFs in a single repository (from multiple vendors, multiple developers, etc.) to provide end-to-end VNF functionalities for networking.

In some implementations, test control device 220 can automatically fix one or more errors in the VNF and deploy the VNF. For example, test control device 220 can utilize machine learning, artificial intelligence etc. to learn fixes to common errors in the VNF based on previous fixes to errors, and based on identifying an error in testing, can automatically apply a fix (e.g., based on generating code, copying code from another VNF, etc.). In some implementations, test control device 220 can utilize supervised machine learning (e.g., test control device 220 can learn from human fixes, thereby enabling machine learning to occur faster and with less resource utilization than by machine learning alone).

As an example of configuring testing for a test package (as described herein with reference to block 420), executing testing for the test package based on configuring testing (as described herein with reference to block 430), and providing output associated with a result of executing testing (as described herein with reference to block 440), test control device 220 can define a set of test cases, can classify the set of test cases by VNF of a group of VNFs of the test package, and can shortlist a subset of test cases for execution (based on criticality, resource availability, etc.). In this case, test control device 220 can execute the shortlisted subset of test cases (e.g., a virtual machine environment test, a VNF health check test, a VNF resource utilization test, a VNF traceroute/ping test, etc.). Thereafter, test control device 220 can notify a vendor of a VNF of the results of executing the shortlist of test cases, can publish the results, and can reject the VNF or accept the VNF.

In this way, test control device 220 provides output associated with a result of executing the test.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
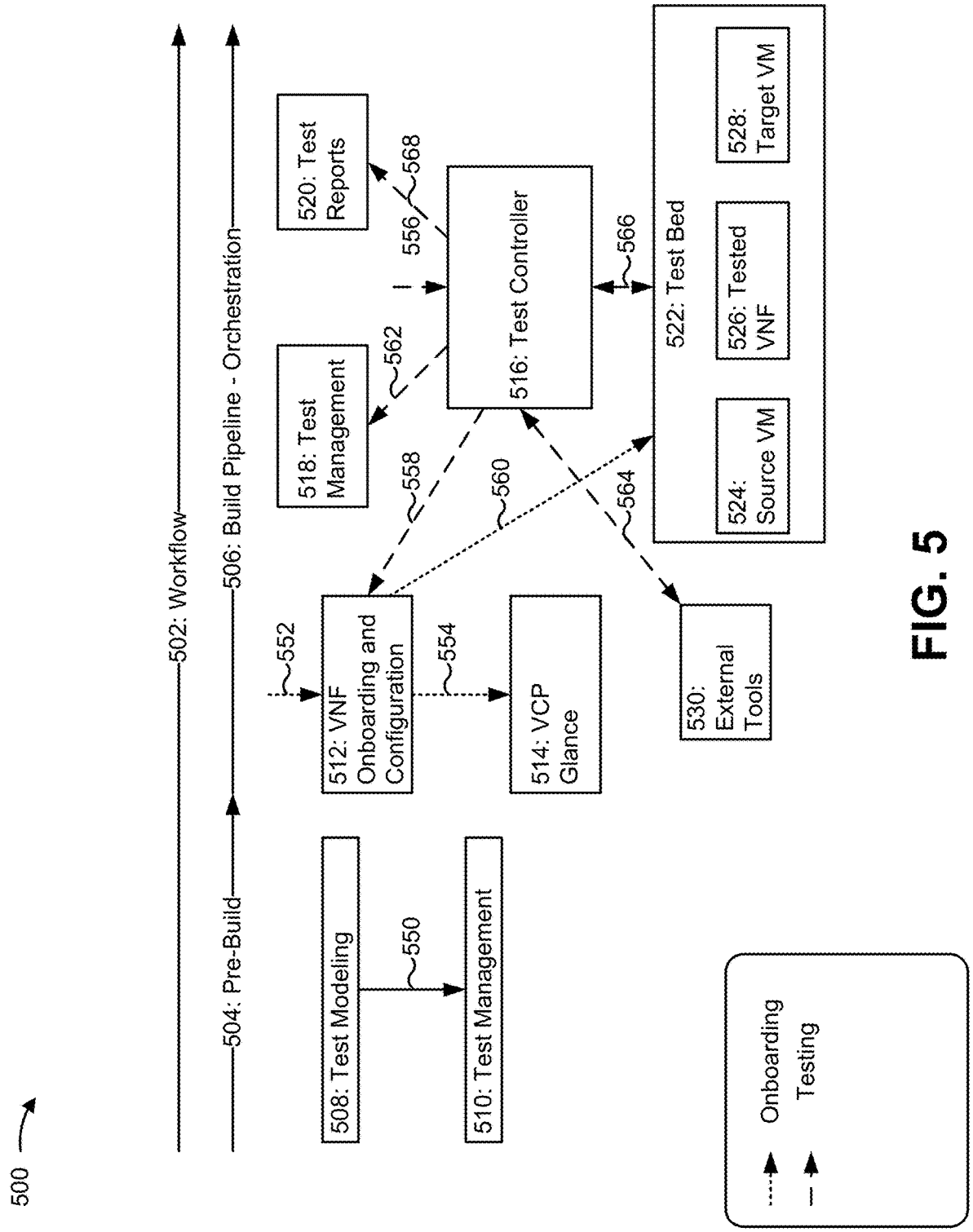
FIG. 5 is a diagram of an example implementation relating to the example process shown in FIG. 4.

FIG. 5 is a diagram of an example implementation 500 relating to example process 400 shown in FIG. 4. FIG. 5 show an example of automated testing for a VNF.

Figure 6:
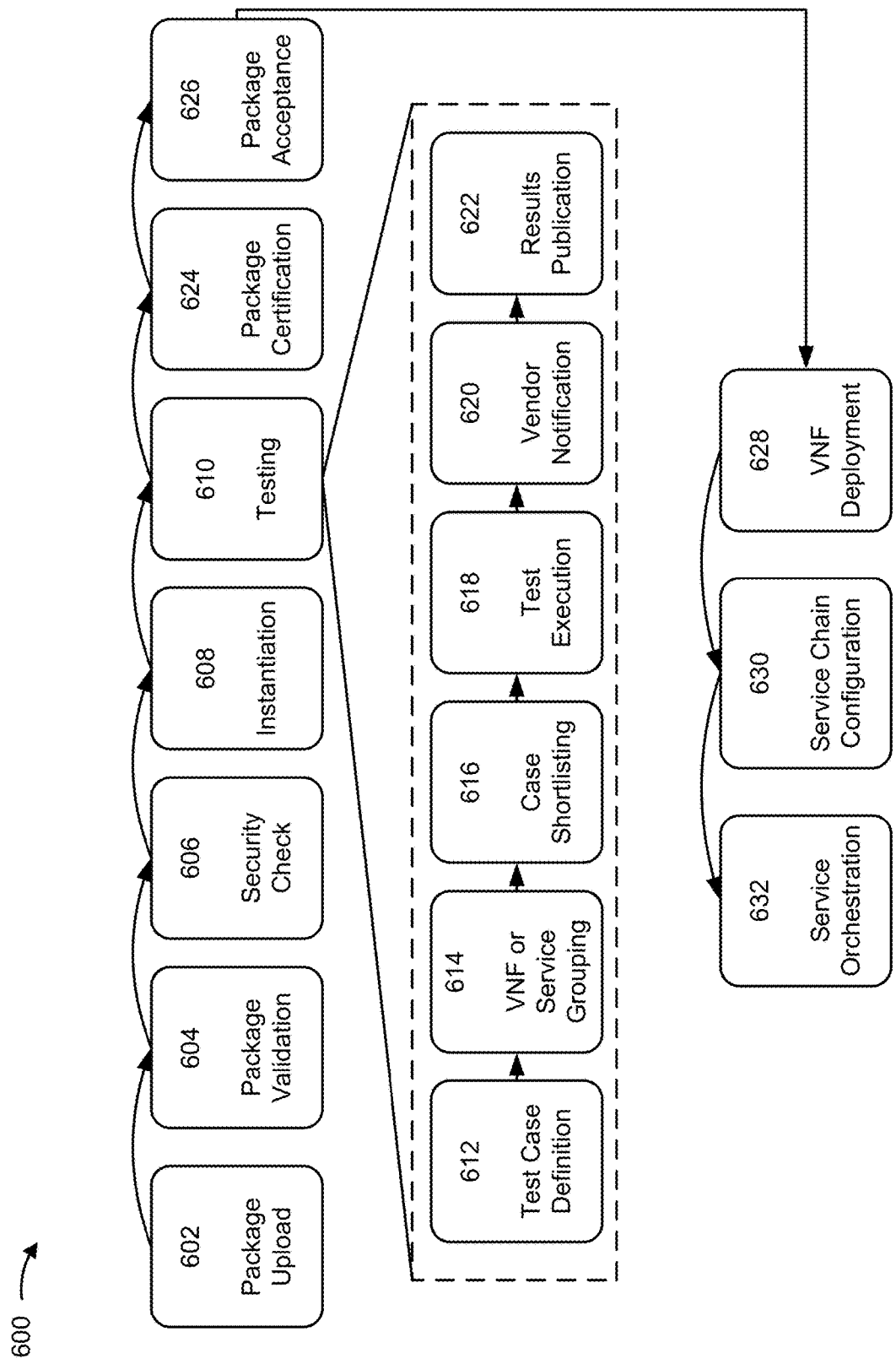
FIG. 6 is a diagram of another example implementation relating to the example process shown in FIG. 4.

FIG. 6 is a diagram of an example implementation 600 relating to example process 400 shown in FIG. 4. FIG. 6 shows an example of automated VNF testing.

As shown in FIG. 5, example implementation 500 can include a workflow 502, which includes pre-build phase 504 and build pipeline-orchestration phase 506. Example implementation 500 can include a set of tasks, such as test modeling 508 (e.g., use case configuration, test case generation from a test model, etc.), test management 510 (e.g., test storage, test classification, test status monitoring, mapping requirements to test cases, etc.), VNF onboarding and configuration 512 (e.g., adding a VNF into a test platform, configuring the VNF, etc.), VCP glance 514 (e.g., storing a VNF to a vendor repository), test management 518 (e.g., test case invocation, test storage, test status determination, mapping requirements to test cases, etc.), and test reports 520 (e.g., reporting test results). The set of functionalities can be orchestrated by test controller 516, which can include test bed 522, and which can instantiate source VM 524, tested VNF 526, and target VM 528.

The set of functionalities can be evaluated in a particular set of test steps 602 through 632, shown in FIG. 6, as described herein.

As further shown in FIG. 5, and by reference number 550, during pre-build phase 504, test controller 516 can generate test cases from a set of test models, and can store the set of test cases for subsequent use. In this way, test controller 516 pre-configures a repository of test cases that can be used for testing a VNF when a VNF is subsequently received and facilitates reuse of test cases for multiple VNFs, thereby reducing processing relative to generating new test cases for each VNF. As shown by reference number 552, test controller 516 can receive a VNF for onboarding, which can trigger build pipeline-onboarding phase 506. As shown by reference number 554, test controller 516 can upload the VNF to a repository for storage, such as for subsequent testing. Additionally, or alternatively, test controller 516 can upload the VNF to the repository based on completing testing, verifying the VNF, validating the VNF, and/or the like.

As further shown in FIG. 5, and by reference number 556, test controller 516 can receive a trigger to proceed with testing of the VNF. As shown by reference number 558, test controller 516 can invoke a set of test cases for onboarding of the VNF. For example, as shown in FIG. 6, test controller 516 can perform a package upload step 602, a package validation step 604, a security check step 606, and/or the like.

As shown by reference number 560, based on test controller 516 invoking the set of test cases, test controller 516 can instantiate the VNF in test bed 522, and can configure testing. For example, as shown in FIG. 6, test controller 516 can perform an instantiation step 608. Based on performing instantiation step 608, test controller 516 can perform testing 610.

As shown by reference number 562, test controller 516 can select a set of test cases for testing the VNF in test bed 522, which can correspond to test case definition step 612, VNF or service grouping step 614 (e.g., classifying the VNF based on a type of the VNF to select test cases matching the type of the VNF), case shortlisting step 616 (e.g., selecting a subset of test cases to satisfy a test coverage requirement without using excessive resources by performing excessive testing), and/or the like. As shown by reference number 564, test controller 516 can access one or more external tools 530, such as one or more traffic emulators, load generators, scripts, and/or the like for testing in test bed 522. As shown by reference number 566, test controller 516 can cause testing to occur using test bed 522. For example, test controller 516 can use tests of test controller 516, tests of external tools 530, and/or functionalities of external tools 530 to cause traffic to be routed from source VM 524 to target VM 528 using tested VNF 526 (e.g., an instantiated instance of the VNF received for testing), which can correspond to test execution step 618.

As shown by reference number 568, test controller 516 can provide one or more test reports identifying a result of the testing, such as a test report indicating test success, test failure, an error for correction, and/or the like. For example, test controller 516 can perform vendor notification step 620 to notify a vendor of the VNF of results, results publication step 622 to provide information identifying results of the testing to other parties (e.g., software engineers, deployment engineers, etc.), and/or the like. In some implementations, test controller 516 can perform one or more post reporting steps, such as package certification step 624 (e.g., certifying that the VNF satisfies one or more testing criteria for deployment), package acceptance step 626 (e.g., accepting the VNF for deployment step), VNF deployment step 628 (e.g., deploying the VNF), and/or the like. In some implementations, test controller 516 can perform one or more other post reporting steps, such as service chain configuration step 630 (e.g., configuring the VNF to operate with one or more other SDN functionalities in a service function chain (SFC)), service orchestration step 632 (e.g., dynamically provisioning and re-provisioning deployed NFVs in a service chain).

As indicated above, FIG. 5 is provided merely as an example. Other examples are possible and can differ from what was described with regard to FIG. 5.

As indicated above, FIG. 6 is provided merely as an example. Other examples are possible and can differ from what was described with regard to FIG. 6.

In this way, test control device 220 can automatically test, certify, and deploy VNFs for use in network 240. Test control device 220 can integrate tools collocated in a cloud computing environment 230 with test control device 220, external tools (e.g., vendor provided tools), and/or the like into an end-to-end testing platform. Moreover, test control device 220 can automatically configure testing for the VNF. In this way, the test control device can reduce an amount of time to test and certify a VNF, thereby improving network performance relative to a manual technique that results in VNF deployment being delayed. Moreover, based on implementing test control device 220 in a cloud computing environment 230, test control device 220 can automatically scale and reallocate computing resources for testing, sandboxing, and/or the like, thereby reducing resource utilization (e.g., computing resource utilization, memory resource utilization, and/or the like) relative to a manual testing technique. Furthermore, based on automating test generation, execution, and validation, test control device 220 can reduce errors relative to manual testing, and can enable thousands and/or millions of tests to be performed, which can be infeasible for a human, thereby improving a quality of VNFs that are deployed.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:

receive a test package for testing,
the test package including at least one virtual network function (VNF) for testing;
configure the testing for the test package based on the VNF included in the test package or a vendor associated with the VNF;
execute the testing for the test package based on configuring the testing for the test package,
the testing including first testing and second testing,
the first testing including onboarding testing,
the onboarding testing including two or more of smoke testing, image load testing, image access testing, resource utilization testing, or configuration testing, and
the second testing including post-onboarding testing,
the post-onboarding testing including at two or more of security testing, networking testing, performance testing, feature function testing, or service chain testing;
generate a report based on a result of executing the testing for the test package;
provide output identifying the report; and
automatically fix one or more errors in the VNF based on the result of executing the testing.

2. The device of claim 1, where the one or more processors are further to:
automatically trigger generation of the test package for the testing during development of the VNF using a continuous integration and continuous deployment tool set.

3. The device of claim 1, where the one or more processors are further to:
automatically deploy the VNF based on the result of the executing the testing.

4. The device of claim 1, where the one or more processors, when configuring the testing, are to:
configure the testing based on a set of test scripts obtained from a test script repository.

5. The device of claim 1, where the one or more processors, when executing the testing, are to:
execute the testing using a set of tools,
the set of tools including at least one of:
a tool collocated with the device,
a vendor provided tool provided by the vendor of the VNF, or
an open source tool.

6. The device of claim 1, where the one or more processors, when receiving the test package, are to:
receive the test package from a version control tool.

7. The device of claim 1, where the one or more processors, when configuring the testing, are to:
configure the testing based on an output from a test case management tool.

8. A non-transitory computer-readable medium storing instructions, the instructions comprising:
one or more instructions that, when executed by one or more processors of a device, cause the one or more processors to:
receive a test package for testing,
the test package including at least one virtual network function (VNF) for testing;
configure the testing for the test package based on the VNF included in the test package or a vendor associated with the VNF;
execute the testing for the test package based on configuring the testing for the test package,
the testing including first testing and second testing,
the first testing including onboarding testing,
the onboarding testing including two or more of smoke testing, image load testing, image access testing, resource utilization testing, or configuration testing, and
the second testing including post-onboarding testing,
the post-onboarding testing including at two or more of security testing, networking testing, performance testing, feature function testing, or service chain testing;
generate a report based on a result of the executing the testing for the test package;
provide output identifying the report; and
automatically fix one or more errors in the VNF based on the result of executing the testing.

9. The non-transitory computer-readable medium of claim 8, where the one or more instructions, that cause the one or more processors to configure the testing, cause the one or more processors to:
configure the testing based on an output of a behavioral driven test case generation tool.

10. The non-transitory computer-readable medium of claim 8, where the one or more instructions, that cause the one or more processors to receive the test package, cause the one or more processors to:
receive the test package from a VNF onboarding portal.

11. The non-transitory computer-readable medium of claim 8, where the one or more instructions, that cause the one or more processors to configure the testing, cause the one or more processors to:
configure the testing based on a role of a user of the device.

12. The non-transitory computer-readable medium of claim 11, where the role corresponds to a privilege for the device of a plurality of privileges for the device.

13. The non-transitory computer-readable medium of claim 8, where the one or more instructions, that cause the one or more processors to generate the report, cause the one or more processors to:
include, in the report, information certifying the VNF for deployment based on the result of the executing the testing.

14. The non-transitory computer-readable medium of claim 8, where the one or more instructions, that cause the one or more processors to generate the report, cause the one or more processors to:
include, in the report, information rejecting the VNF for deployment based on the result of the executing the testing.

15. A method, comprising:
receiving, by a cloud computing environment, a test package for testing,
the test package including at least one virtual network function (VNF) for testing;
configuring, by the cloud computing environment, the testing for the test package based on the VNF included in the test package or a vendor associated with the VNF;
executing, by the cloud computing environment, the testing for the test package based on configuring the testing for the test package,
the testing including first testing and second testing,
the first testing including onboarding testing, the onboarding testing including two or more of smoke testing, image load testing, image access testing, resource utilization testing, or configuration testing; and the second testing including post-onboarding testing, the post-onboarding testing including at two or more of security testing, networking testing, performance testing, feature function testing, or service chain testing;

generating, by the cloud computing environment, a report based on a result of the executing the testing for the test package;

providing, by the cloud computing environment, output identifying the report; and automatically fixing, by the cloud computing environment, one or more errors in the VNF based on the result of executing the testing.

16. The method of claim 15, where the onboarding testing includes three or more of:
 smoke testing,
 image load testing,
 image access testing,
 resource utilization testing, or
 configuration testing.

17. The method of claim 15, where the post-onboarding testing includes three or more of:
 security testing,
 networking testing,
 performance testing,
 feature function testing, or
 service chain testing.

18. The method of claim 15, further comprising:
 storing the VNF to a repository for deployment based on the result of the executing the testing.

19. The method of claim 15, where generating the report comprises:
 generating a user interface including information regarding the result of the executing the testing.

20. The method of claim 15, further comprising:
 automatically deploying the VNF based on the result of the executing the testing.

* * * * *